US008006666B2

(12) United States Patent
Ashida et al.

(10) Patent No.: US 8,006,666 B2
(45) Date of Patent: Aug. 30, 2011

(54) AUXILIARY COMBUSTION CHAMBER TYPE INTERNAL COMBUSTION ENGINE

(75) Inventors: Koichi Ashida, Yokohama (JP); Toru Noda, Yokohama (JP); Masashi Kuroda, Yokosuka (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 261 days.

(21) Appl. No.: 11/727,170

(22) Filed: Mar. 23, 2007

(65) Prior Publication Data
US 2007/0221164 A1    Sep. 27, 2007

(30) Foreign Application Priority Data

Mar. 24, 2006    (JP) .................................. 2006-083152

(51) Int. Cl.
F02B 19/14    (2006.01)
F02B 19/18    (2006.01)
(52) U.S. Cl. .......................... 123/275; 123/267; 123/638
(58) Field of Classification Search ................ 123/48 D, 123/143 R, 471, 257, 260, 265, 253, 406.11, 123/406.5, 406.51, 267, 277, 299, 406.24, 123/406.35, 638
See application file for complete search history.

(56) References Cited

U.S. PATENT DOCUMENTS

| | | | | | |
|---|---|---|---|---|---|
| 1,759,425 | A | * | 5/1930 | Suekoff | 123/260 |
| 1,925,086 | A | * | 9/1933 | Snyder | 123/48 D |
| 2,045,858 | A | * | 6/1936 | Jung | 123/48 D |
| 2,184,357 | A | * | 12/1939 | Mallory | 123/275 |
| 3,696,798 | A | * | 10/1972 | Bishop et al. | 123/262 |
| 3,830,205 | A | * | 8/1974 | Date et al. | 123/259 |
| 3,875,915 | A | * | 4/1975 | Anderson et al. | 123/335 |
| 3,935,844 | A | * | 2/1976 | Nishimiya et al. | 123/640 |
| 3,945,365 | A | * | 3/1976 | Regueiro | 123/265 |
| 4,078,533 | A | * | 3/1978 | Nohira | 123/260 |
| 4,104,997 | A | * | 8/1978 | Padgitt | 123/406.66 |
| 4,257,376 | A | * | 3/1981 | Wen | 123/472 |
| 4,489,686 | A | * | 12/1984 | Yagi et al. | 123/260 |
| 4,633,844 | A | * | 1/1987 | Okimoto | 123/406.45 |
| 4,924,823 | A | * | 5/1990 | Ogura et al. | 123/64 |
| 5,327,864 | A | * | 7/1994 | Regueiro | 123/260 |
| 6,055,954 | A | * | 5/2000 | Takada et al. | 123/257 |

FOREIGN PATENT DOCUMENTS

| | | |
|---|---|---|
| JP | 50-121102 | 10/1975 |
| JP | 57-140517 | 8/1982 |
| JP | 59-224475 | 12/1984 |
| JP | 61-017183 | 1/1986 |
| JP | 07-026961 | 1/1995 |

(Continued)

Primary Examiner — Mahmoud Gimie
(74) Attorney, Agent, or Firm — Drinker Biddle & Reath LLP

(57) ABSTRACT

An internal combustion engine includes a main combustion chamber, an auxiliary combustion chamber, a partition wall that separates the main and auxiliary combustion chambers, a first igniter disposed in the auxiliary combustion chamber, a second igniter disposed in the main combustion chamber, and a controller electrically coupled to the first and second igniters. The auxiliary combustion chamber has a capacity smaller than that of the main combustion chamber. The partition wall includes a communication passage. The controller is adapted to send an auxiliary combustion chamber ignition timing signal to the first igniter and is adapted to send a main combustion chamber ignition timing signal to the second igniter. Further, the controller is adapted to send the auxiliary and main combustion chamber ignition timing signals such that, in response to at least one engine operating condition, ignition in the auxiliary combustion chamber occurs after ignition in the main combustion chamber.

15 Claims, 8 Drawing Sheets

FOREIGN PATENT DOCUMENTS

| | | |
|---|---|---|
| JP | 08-284665 | 10/1996 |
| JP | 2000-008960 | 1/2000 |
| JP | 2000-337150 | 12/2000 |
| JP | 2002-070558 | 3/2002 |

* cited by examiner

[FIG. 1]
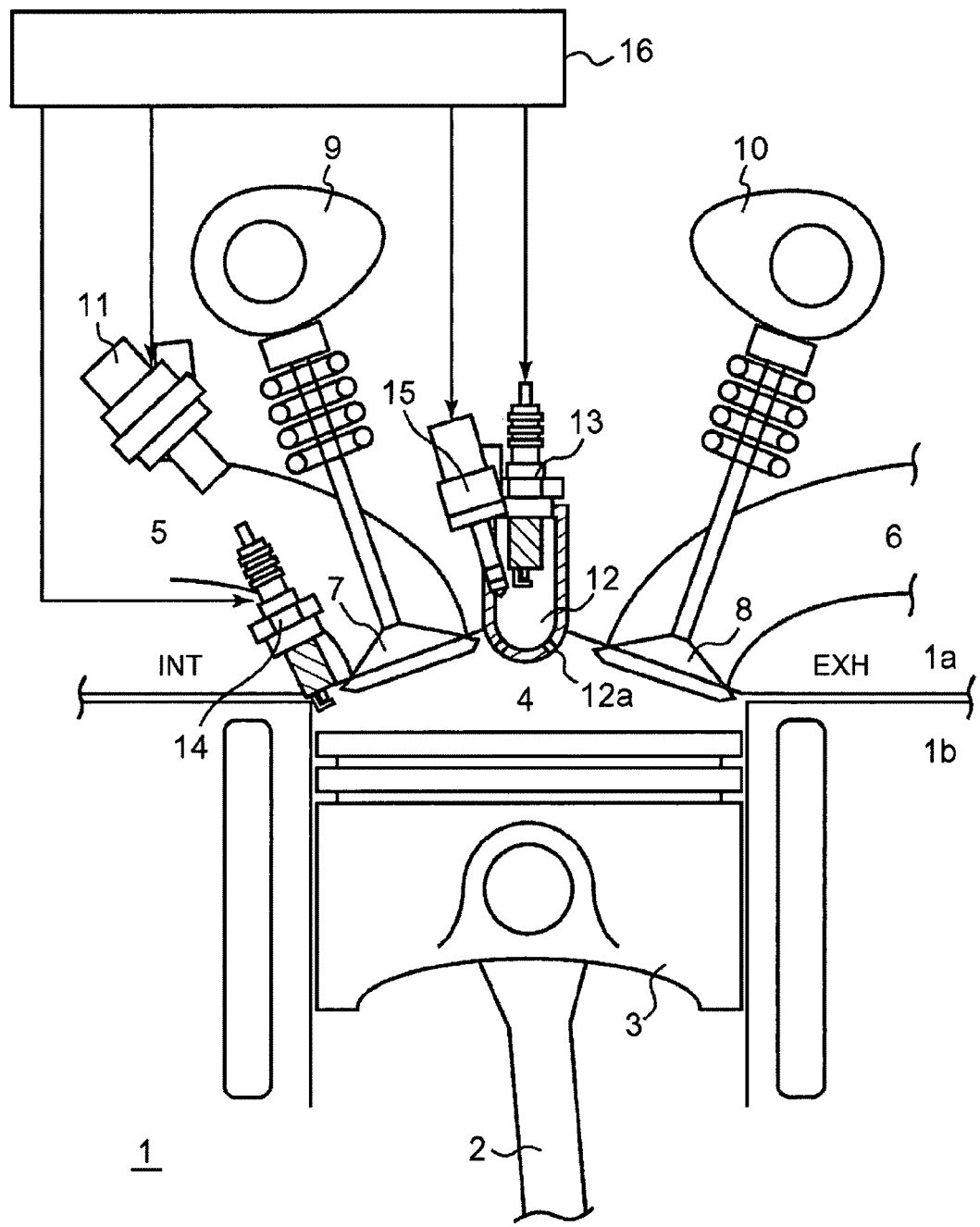

[FIG. 2(1)]
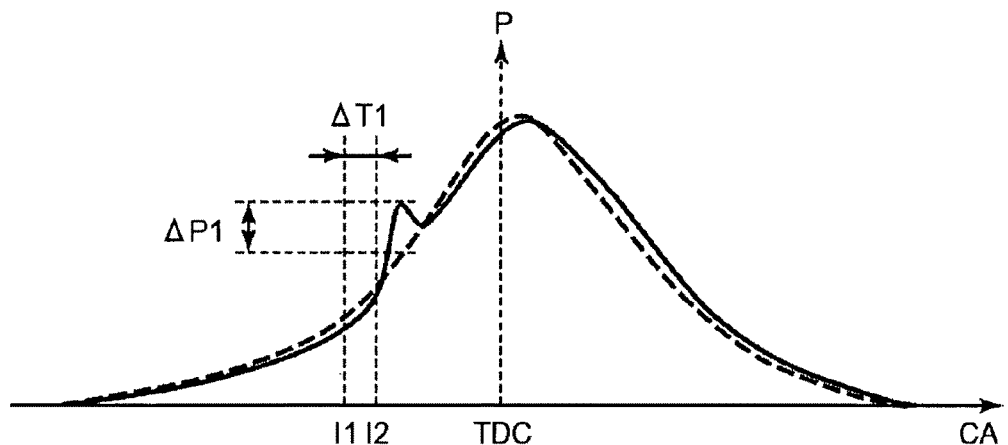
(1)
[FIG. 2(2)]
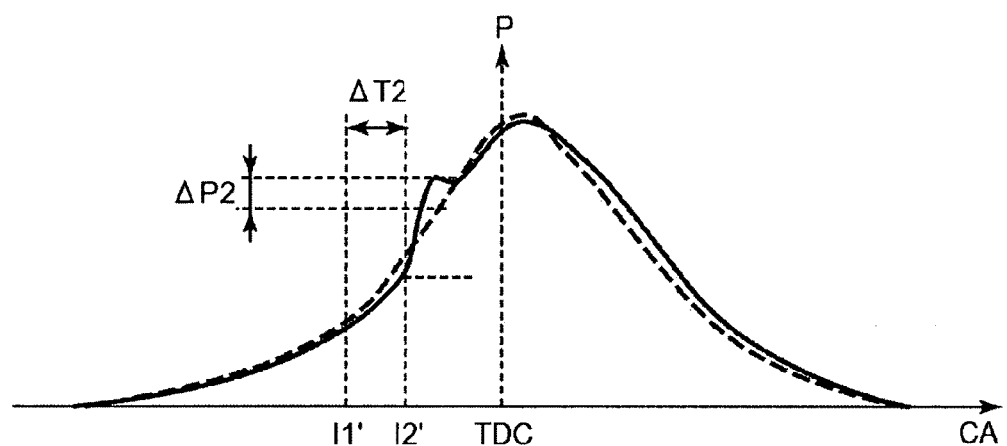
(2)

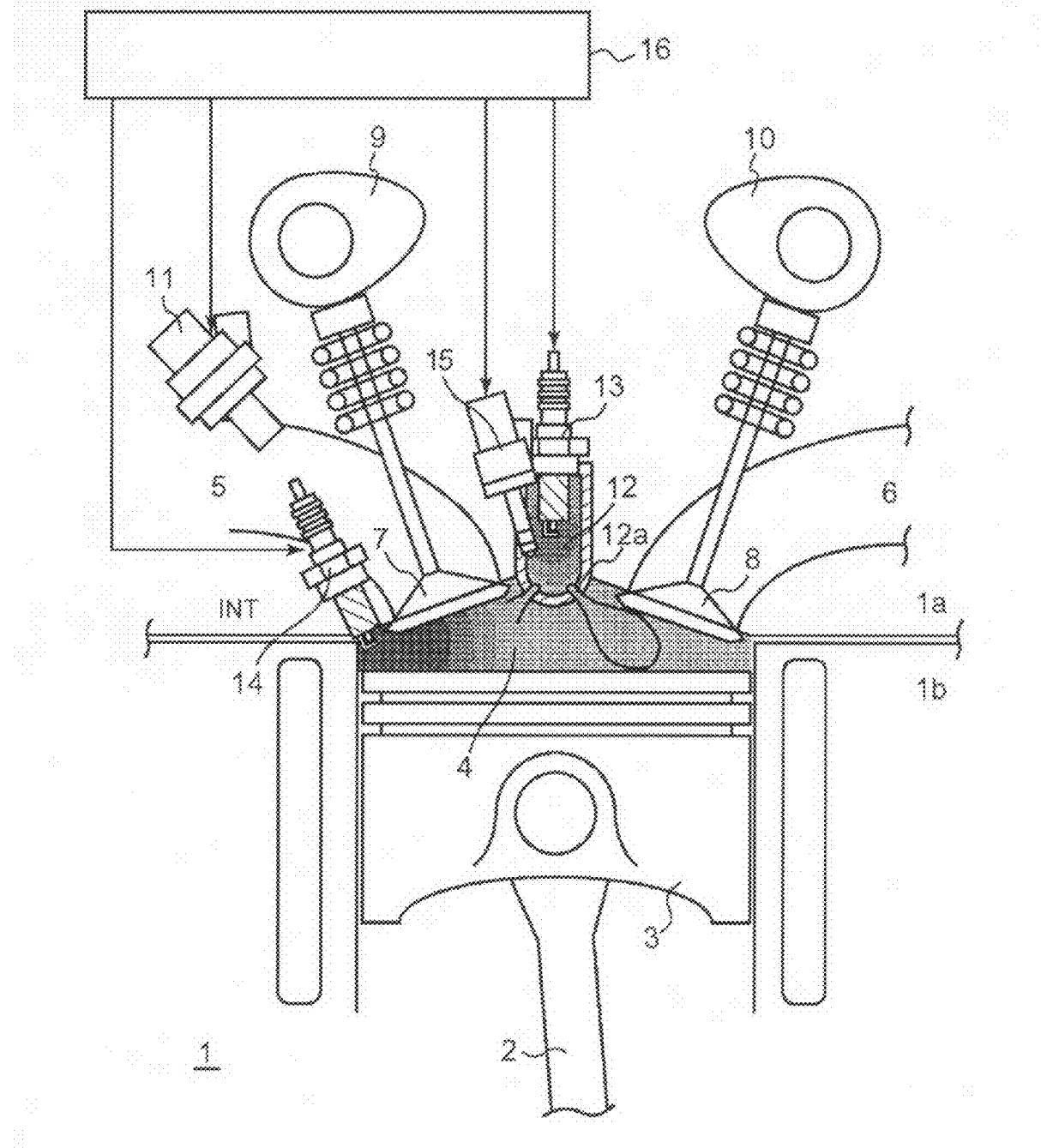
[FIG. 3]

[FIG. 4]
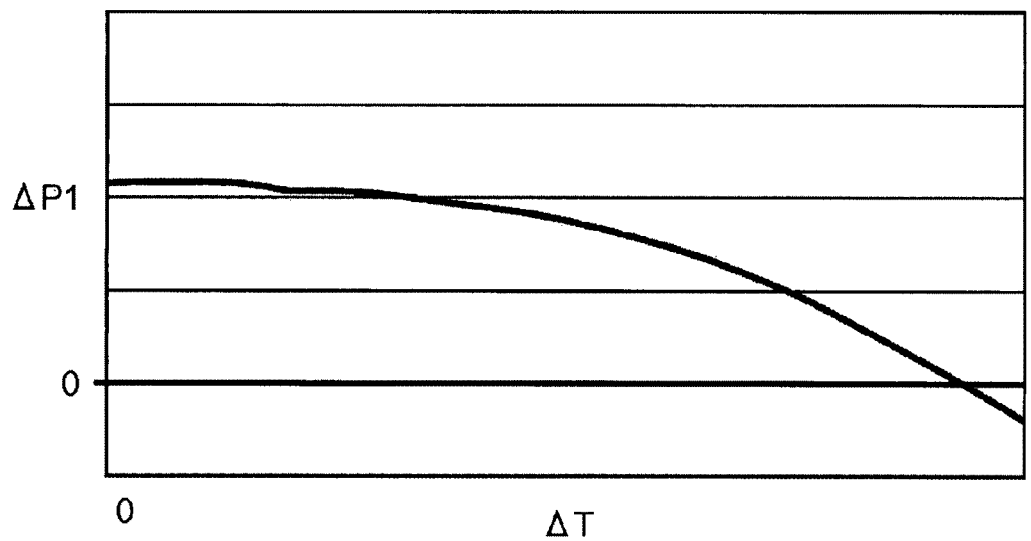
[FIG. 5]
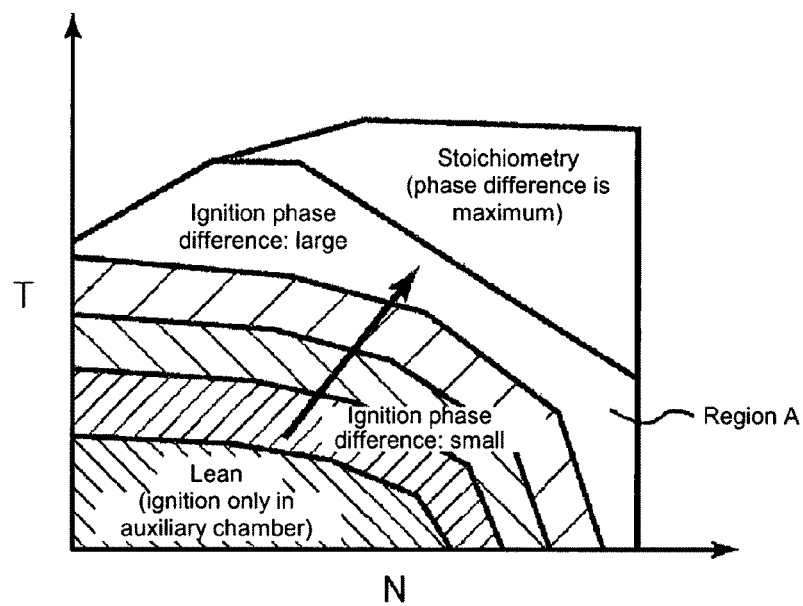

[FIG. 6]
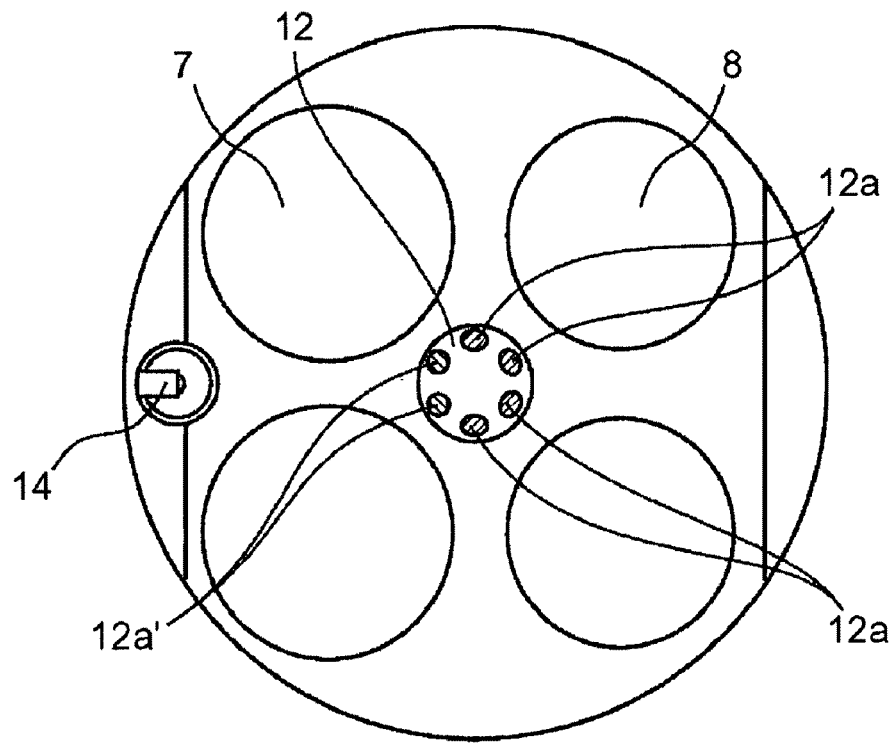
[FIG. 7]
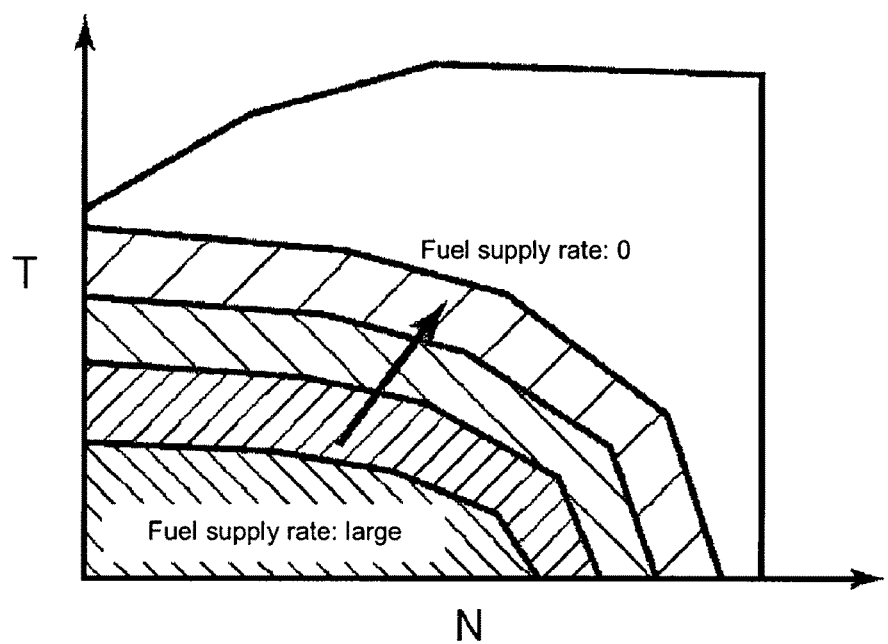

[FIG. 8]
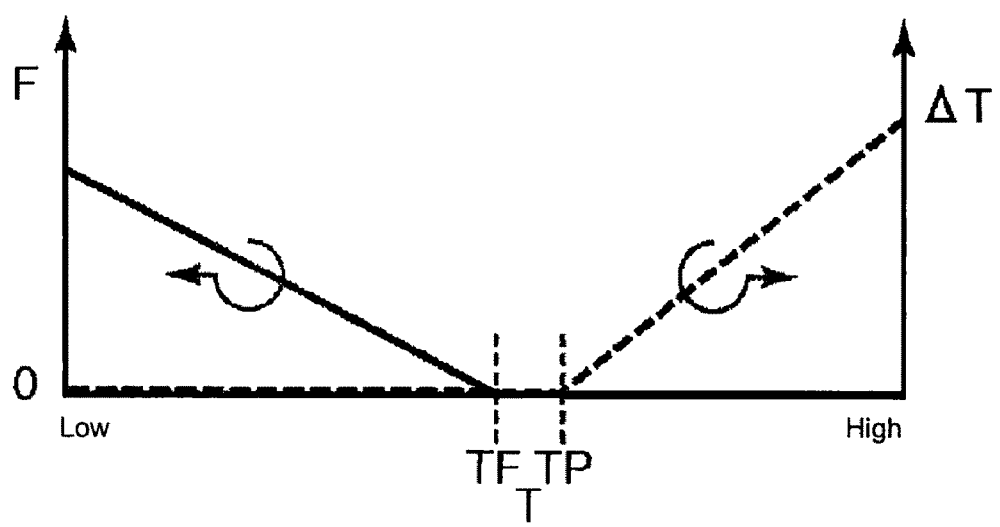

[FIG. 9]
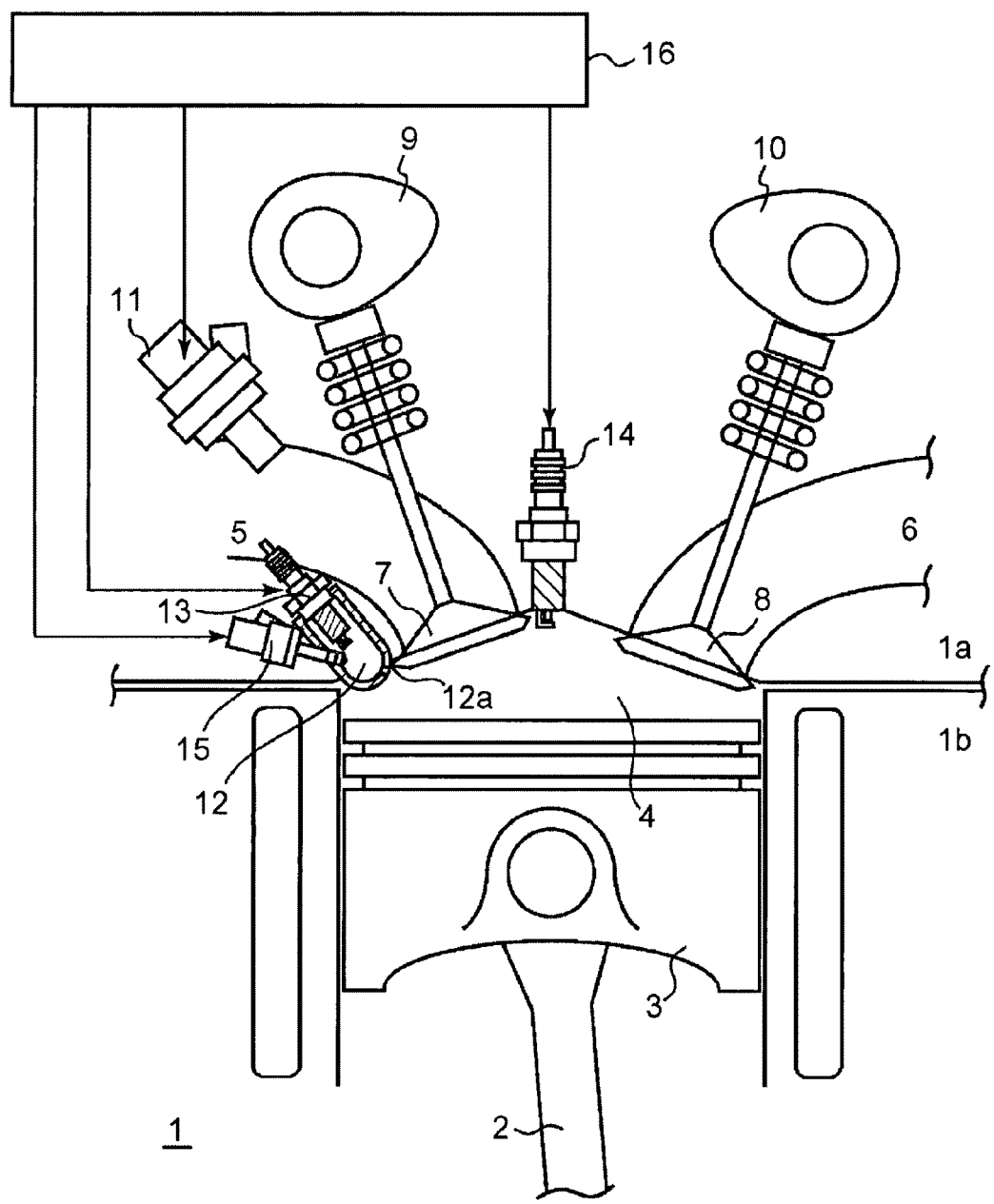

[FIG. 10]
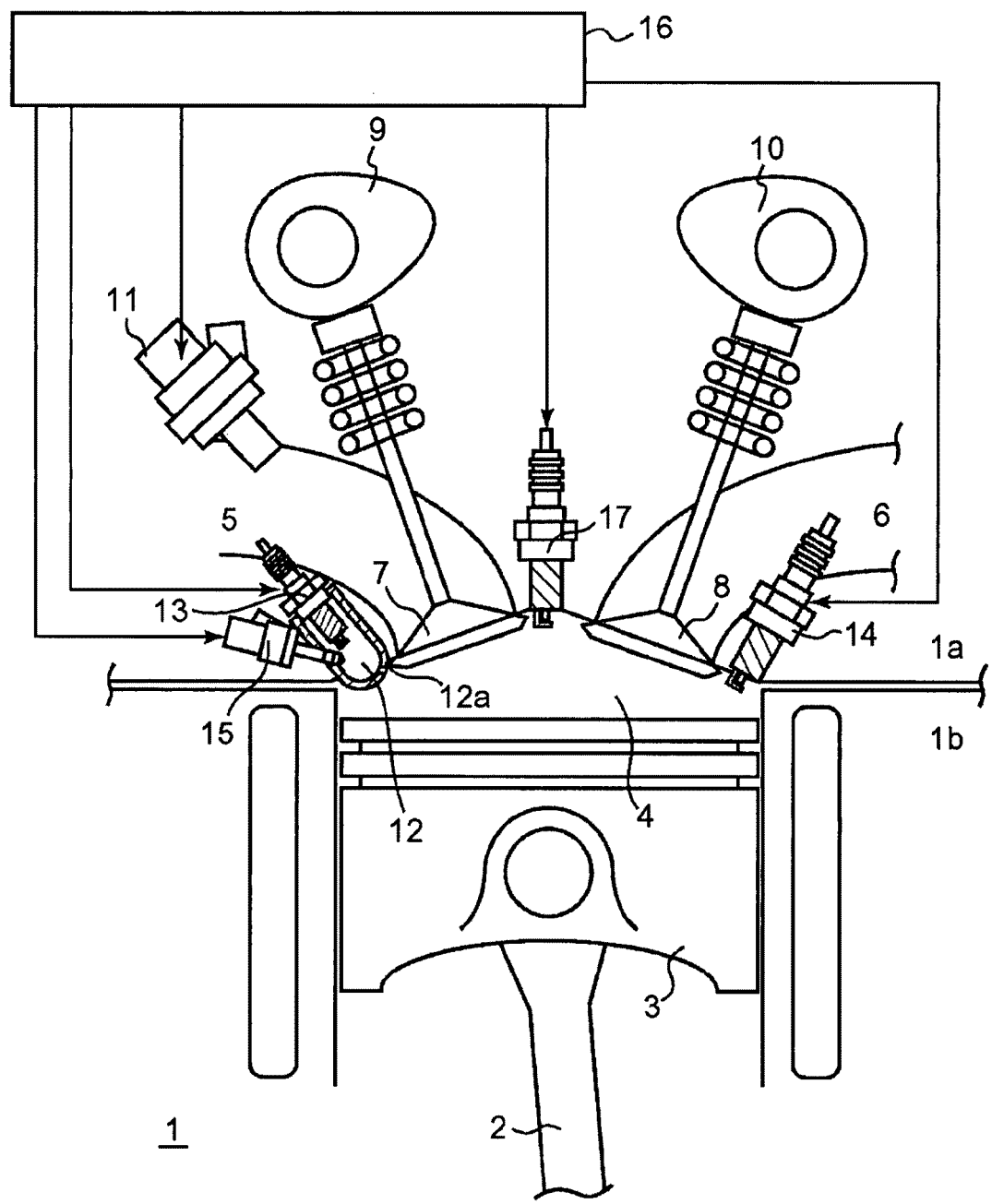

AUXILIARY COMBUSTION CHAMBER TYPE INTERNAL COMBUSTION ENGINE

CROSS-REFERENCE TO RELATED APPLICATIONS

This application claims priority under 35 U.S.C. §119 to Japanese Patent Application No. 2006-083152, filed on Mar. 24, 2006, the disclosure of which is incorporated by reference herein in its entirety.

BACKGROUND OF THE INVENTION

1. Field of the Invention

The present invention pertains to the technical field of an internal combustion engine having an auxiliary combustion chamber, and more particularly, to a technique for controlling intensity of a torch flame directed from the auxiliary combustion chamber to a main combustion chamber.

2. Description of Related Art

In order to improve heat efficiency and exhaust performance of an internal combustion engine, a lean air/fuel mixture (also referred to as a "diluted mixture") may be provided to the engine when it is operating at a relatively low engine load. In a related internal combustion engine, it is known to provide a main combustion chamber and an auxiliary combustion chamber. Such an internal combustion engine may also be referred to as an "auxiliary combustion chamber type internal combustion engine." According to this related internal combustion engine, a torch flame (also referred to as a "flame jet") is directed from the auxiliary combustion chamber to the main combustion chamber so as to promote the burning of a diluted mixture in the main combustion chamber.

According to the related internal combustion engine, an appropriate intensity torch flame may shorten a delay in igniting a mixture in the main combustion chamber, and may expand the engine operating conditions during which knocking is prevented. As it is used herein, the terms "knock" or "knocking," also known as "pinging" or "detonation," refers to when the air/fuel mixture in a combustion cylinder has been ignited, but smooth combustion is interrupted when an unburned mixture portion in the combustion chamber explodes before being reached by a flame front. The torch flame that is directed from the auxiliary combustion chamber according to the related internal combustion engine is fixed by, for example, the shape of the auxiliary combustion chamber. Thus, a problem with the related internal combustion engine is that it is not possible to optimize the torch flame for a given engine operation condition.

According to another related internal combustion engine, a torch flame impinges on a piston surface to cool the torch flame jet, thereby suppressing knocking. However, a problem according to this related internal combustion engine is increased engine cooling losses, i.e., energy lost due to heating of the engine structure, because the torch flame impinges on the piston surface. Moreover, in addition to deteriorated net heat efficiency, an appropriate intensity torch flame is not provided for a given engine operation condition.

Thus, it would be desirable to provide an auxiliary combustion chamber type internal combustion engine that does not suffer from the problems of the related art internal combustion engines. In particular, it would be desirable to provide an auxiliary combustion chamber type internal combustion engine with improved net heat efficiency and with an appropriate intensity torch flame for a given engine operating condition.

BRIEF SUMMARY OF THE INVENTION

The present invention relates to overcoming the problems of the related internal combustion engines and providing an auxiliary combustion chamber type internal combustion engine capable of providing a torch flame of the optimal intensity for a given engine operating condition.

In accordance with an aspect of an embodiment of the invention, there is provided an internal combustion engine that includes a main combustion chamber, an auxiliary combustion chamber, a first igniter disposed in the auxiliary combustion chamber, a second igniter disposed in the main combustion chamber, and a controller electrically coupled to the first and second igniters. The auxiliary combustion chamber has a capacity smaller than that of the main combustion chamber and is fluidly communicated with the main combustion chamber through a torch flame passage formed therebetween. The controller configured to determine and control ignition timings of the first and second igniters respectively in response to at least one engine operating condition such that ignition in the auxiliary combustion chamber occurs after ignition in the main combustion chamber.

In accordance with another aspect of an embodiment of the invention, there is provided an internal combustion engine including a main combustion chamber, an auxiliary combustion chamber, and structure for timing ignition in the auxiliary combustion chamber after ignition in the main combustion chamber. The auxiliary combustion chamber has a capacity smaller than that of the main combustion chamber and is separated from the main combustion chamber by a partition wall. The partition wall includes at least one communication passage.

In accordance with yet another aspect of an embodiment of the invention, the intensity of a torch flame directed from an auxiliary combustion chamber to a main combustion chamber is determined based on a pressure difference between the main combustion chamber and the auxiliary combustion chamber. Thus, for a given engine operating condition, the air/fuel mixture in the main combustion chamber may be ignited before igniting the air/fuel mixture in the auxiliary combustion chamber, which makes it possible to increase the pressure in the main combustion chamber. Therefore, it is possible to control the pressure difference between the main combustion chamber and the auxiliary combustion chamber when a torch flame is directed from the auxiliary combustion chamber to the main combustion chamber, and optimal torch flame intensity can be provided for a given engine operating condition.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 1 is a schematic diagram illustrating a first embodiment of an auxiliary combustion chamber type internal combustion engine.

FIGS. 2(1) and 2(2) are graphs showing relationships between phase difference, i.e., timing between ignition in a main combustion chamber and ignition in an auxiliary combustion chamber, and pressures in the main and auxiliary combustion chambers, wherein FIG. 2(1) shows the relationships when the phase difference is relatively small, and FIG. 2(2) shows the relationships when the phase difference is relatively large.

FIG. 3 is a schematic diagram illustrating combustion in a main combustion chamber and a torch flame directed from an auxiliary combustion chamber to the main combustion chamber.

FIG. 4 is a graph showing a relationship between the phase difference and torch intensity according to the first embodiment.

FIG. 5 is a graph showing relationships for given engine operating conditions between an air/fuel ratio and the phase difference according to the first embodiment.

FIG. 6 is an underside view of the main and auxiliary combustion chambers according to the first embodiment.

FIG. 7 is a graph showing a relationship between engine operating conditions and an amount of fuel supplied to the auxiliary combustion chamber according to the first embodiment.

FIG. 8 is a graph showing relationships between engine load, the amount of fuel supplied to the auxiliary combustion chamber, and the phase difference.

FIG. 9 is a schematic diagram illustrating a second embodiment of an auxiliary combustion chamber type internal combustion engine.

FIG. 10 is a schematic diagram illustrating a third embodiment of an auxiliary combustion chamber type internal combustion engine.

DETAILED DESCRIPTION OF THE PREFERRED EMBODIMENTS

Referring to FIGS. 1 to 8, a first embodiment of an internal combustion engine 1 includes a cylinder head 1a and a cylinder block 1b. The cylinder head 1a, the cylinder block 1b and a piston 3 form a main combustion chamber 4. In a known manner, the piston 3 transmits a driving force to an output shaft (not shown) through a connecting rod 2.

An auxiliary combustion chamber 12 is disposed at substantially a central portion of the main combustion chamber 4 on an underside of the cylinder head 1a. Preferably, the auxiliary combustion chamber 12 has a capacity that is smaller than that of the main combustion chamber 4. An auxiliary combustion chamber spark plug 13 (also referred to as an "igniter" or "first igniter") is disposed in the auxiliary combustion chamber 12. Preferably, an auxiliary combustion chamber fuel injection valve 15 (also referred to as an "injector") directly supplies a fuel into the auxiliary combustion chamber 12. The fuel supplied by the auxiliary combustion chamber fuel injection valve 15 may be reformed fuel that is provided by a fuel reforming apparatus (not shown).

Fresh combustion components are supplied to the main combustion chamber 4 through an intake port 5, and combustion products are discharged from the main combustion chamber 4 through an exhaust port 6. An intake valve 7 may be driven by an intake cam 9 and an exhaust valve 8 may driven by an exhaust cam 10, thereby controlling the supply the fresh combustion components and the discharge of combustion products, respectively.

The intake port 5 includes a fuel injection valve 11 (also referred to as an "injector" or "multi-port injector") which injects fuel, e.g., gasoline. The main combustion chamber 4 and the auxiliary combustion chamber 12 are in fluid communication with each other through at least one communication passage 12a. The fuel that is injected from the fuel injection valve 11 to the intake port 5 is supplied to the main combustion chamber 4 as one of the fresh combustion components, and is also supplied to the auxiliary combustion chamber 12 via the at least one communication passage 12a.

According to the first embodiment, a main combustion chamber spark plug 14 (also referred to an "igniter" or "second igniter") is disposed in the main combustion chamber 4. The main combustion chamber spark plug 14 is preferably disposed at a substantially outer peripheral portion of the main combustion chamber 4 and near the intake port 5. As they are used herein, the phrases "central portion" and "peripheral portion" generally refer to the relative proximity with respect to a centerline and a circumferential periphery, respectively, of the main combustion chamber 4.

In a known manner, an engine control unit (ECU) 16 is preferably a digital computer that may include a central processing unit (CPU), a read-only-memory (ROM), a random access memory (RAM), and an output interface. The ECU 16 receives input signals from various sensors (not illustrated) that represent various engine operating conditions. For example, an accelerator opening signal from an accelerator opening sensor may detect engine load, a water temperature signal from a water temperature sensor may detect engine temperature, and a crank angle signal from a crank angle sensor may detect the angular position of a crankshaft (not shown), and which may be used by the ECU 16 to calculate engine rotation speed (e.g., number of revolutions per minute of the engine 1). In response to the input signals, the ECU 16 controls various parameters that govern operation of the engine 1. For example, the ECU 16 may control the amount and timing of the fuel injected by the fuel injection valve 11, the amount and timing of the fuel injected by the auxiliary combustion chamber fuel injection valve 15, the ignition timing of the auxiliary combustion chamber spark plug 13, and the ignition timing of the main combustion chamber spark plug 14.

In accordance with a given engine operating condition of the engine 1, the ECU 16 controls a phase difference between the ignition timing of the main combustion chamber spark plug 14 (i.e., ignition of the combustion components in the main combustion chamber 4) and the ignition timing of the auxiliary combustion chamber spark plug 13 (i.e., ignition of the combustion components in the auxiliary combustion chamber 12).

Referring additionally to FIGS. 2(1) and 2(2), the crankshaft angle (CA) of the engine 1 is shown along the horizontal axis and pressures in the main and auxiliary combustion chambers 4, 12 are shown along the vertical axis shows. Top-dead-center (TDC) of the piston 3 is also shown in each graph. Broken lines show the pressure in the main combustion chamber 4 and solid lines show the pressure in the auxiliary combustion chamber 12.

FIG. 2(1) shows a case in which the phase difference ($\Delta T1$) is relatively small, and FIG. 2(2) shows a case in which the phase difference ($\Delta T2$) is relatively large. Here, the phase difference is determined by the crank angle. Symbols I1 and I1' each denote the timing of ignition in the main combustion chamber 4, and symbols I2 and I2' each denote the timing of ignition in the auxiliary combustion chamber 12. Symbols $\Delta P1$ and $\Delta P2$ denote the maximum pressure differences between the main and auxiliary combustion chambers 4, 12 in the respective cases.

In both FIGS. 2(1) and 2(2), the pressure in the main combustion chamber 4 is increased by the ignition in the main combustion chamber 4. This is because the combustion of combustion components in the main combustion chamber 4 proceeds due to the ignition by the main combustion chamber spark plug 14.

Then, the pressure in the auxiliary combustion chamber 12 increases due to the subsequent ignition by the auxiliary combustion chamber spark plug 13 of the combustion components in the auxiliary combustion chamber 12, and the pressure in the auxiliary combustion chamber 12 exceeds the pressure in the main combustion chamber 4. At that time, a torch flame is directed from the auxiliary combustion chamber 12, through the at least one communication passage 12a, to the main combustion chamber 4.

Referring additionally to FIG. 3, combustion starts from a portion near the main combustion chamber spark plug 14 and the pressure in the main combustion chamber 4 increases. When the combustion components in the auxiliary combustion chamber 12 are ignited by the auxiliary combustion chamber spark plug 13, the torch flame is directed through the at least one communication passage 12a to the main combustion chamber 4. As described above, the intensity of the torch flame is determined by the pressure difference between the auxiliary combustion chamber 12 and the main combustion chamber 4 when the torch flame is directed through the at least one communication passage 12a.

Referring again to FIG. 2(1), there is a relatively small phase difference $\Delta T1$ between the ignition timing I1 of the combustion components in the main combustion chamber and the ignition timing I2 of the combustion components in the auxiliary combustion chamber. Therefore, the increase in pressure in the auxiliary combustion chamber 12 starts as the pressure in the main combustion chamber 4 is increasing, i.e., well before maximum pressure is achieved in the main combustion chamber 4. As a result, the maximum pressure difference $\Delta P1$ is relatively large, thereby allowing a relatively strong torch flame to be directed through the at least one communication passage 12a.

On the other hand, FIG. 2(2) shows a relatively large phase difference $\Delta T2$ between the ignition timing I1' of ignition in the main combustion chamber and the ignition timing I2' of ignition in the auxiliary combustion chamber. Therefore, the pressure increase in the auxiliary combustion chamber 12 starts after the pressure in the main combustion chamber 4 has been sufficiently increased by the ignition in the main combustion chamber. Thus, the maximum pressure difference $\Delta P2$ is relatively small, thereby allowing a relatively weak torch flame to be directed through the at least one communication passage 12a.

Referring now to FIG. 4, there is illustrated a relation between the torch flame intensity and the phase difference, which is the timing between ignition in the main combustion chamber 4 and subsequent ignition in the auxiliary combustion chamber 12. The horizontal axis shows the phase difference ($\Delta T$), and the vertical axis shows the torch flame intensity in terms of the pressure difference ($\Delta P$) between the auxiliary combustion chamber 12 and the main combustion chamber 4. As the phase difference increases, the torch flame intensity reduces. This is because the combustion in the main combustion chamber 4 has proceeded more when the phase difference is greater, and thereby the pressure in the main combustion chamber 4 is also greater.

The first embodiment advantageously takes into account the phase difference between the ignition in the main combustion chamber 4 and the ignition in the auxiliary combustion chamber 12 to provide optimal torch flame intensity control for a given operating state of the engine 1. FIG. 5 illustrates a relation among a set of engine operating conditions, the air/fuel ratio in the main combustion chamber 4, and the phase difference. In particular, the set of engine operating conditions includes the number of revolutions (N) of the engine 1, as shown along horizontal axis, and engine load (T), as shown along the vertical axis.

As illustrated in FIG. 5, when the engine load or the number of revolutions of the engine increases, the air/fuel ratio is increased from a lean mixture to a stoichiometric mixture. As the air/fuel ratio increases, the intensity of the torch flame also tends to increase. This is because if the air/fuel ratio in the main combustion chamber 4 is relatively high, the air/fuel ratio in the auxiliary combustion chamber 12 also becomes relatively high since the air/fuel mixture that is introduced into the auxiliary combustion chamber 12 comes from the main combustion chamber 4, as described above. However, combustion noise may also increase if the torch flame collides against a crown of the piston.

According to the first embodiment, as the engine load or the number of revolutions of the engine is increased, the ECU 16 increases the phase difference. Accordingly, the torch flame intensity is weakened, and combustion noise created by the torch flame may at least be reduced and preferably is eliminated.

Preferably, the ECU 16 maximizes the phase difference when the engine operating conditions include high numbers of revolutions and high engine load. Under these operating conditions, the combustion components in the main combustion chamber 4 burn stably without relying on a strong torch flame intensity since the air/fuel ratio is relatively high. At the same time, ignition of the combustion components in the auxiliary combustion chamber 12 still occurs, primarily to prevent any unburned combustion components from remaining in the auxiliary combustion chamber 12. Preferably, the maximum value of the phase difference is previously obtained by experimentation or the like as a crank angle that is required for the flame front to reach the auxiliary combustion chamber 12.

Under the engine operating conditions including low numbers of revolutions and low engine load, i.e., conditions under which there is frequently a relatively lean air/fuel ratio, ignition by the main combustion chamber spark plug 14 in the main combustion chamber 4 may be discontinued and only the combustion components in the auxiliary combustion chamber 12 are ignited since the torch flame intensity is limited by the relatively lean air/fuel ratio.

Referring now to FIG. 6, which is a view of the underside of the main combustion chamber 4, e.g., looking along the main combustion chamber 4 centerline, the relative positions of the main combustion chamber 4, the auxiliary combustion chamber 12, and the main combustion chamber spark plug 14 are shown. Preferably, there are a plurality of communication passages 12a and 12a' (e.g., a total of six are shown) between the main combustion chamber 4 and the auxiliary combustion chamber 12. According to the first embodiment, the opening areas of the communication passages 12a' (e.g., two are shown) that are oriented toward the main combustion chamber spark plug 14 may be smaller than those of the other communication passages 12a (e.g., four are shown).

The flame front that is generated in the main combustion chamber 4 due to ignition by the main combustion chamber spark plug 14 proceeds from left to right in the main combustion chamber shown in FIG. 6. If the injection holes 12a and 12a' are formed as shown in FIG. 6, the torch flame that is directed from the auxiliary combustion chamber 12 to the main combustion chamber 4 is biased toward the right.

According to the first embodiment, the auxiliary combustion chamber fuel injection valve 15 may be provided in the auxiliary combustion chamber 12. A fuel reforming apparatus (not shown) may supply reformed fuel to the auxiliary combustion chamber fuel injection valve 15. Preferably, the reformed fuel has a higher combustion speed than the fuel that is supplied to the main combustion chamber 4 by the fuel injection valve 11. Hydrogen is an example of a reformed fuel that may be obtained by reforming gasoline.

Referring now to FIG. 7, there is illustrated a relationship between engine operating conditions and a fuel supply rate by the auxiliary combustion chamber fuel injection valve 15 to the auxiliary combustion chamber 12. Similar to FIG. 5, under engine operating conditions including high numbers of revolutions and high engine load, the combustion components in the main combustion chamber 4 are not burned by the torch flame; whereas, under engine operating conditions including low numbers of revolutions and low engine load, the combustion components in the main combustion chamber 4 are burned by the torch flame. Under the engine operating conditions including low numbers of revolutions and low engine load, the fuel supply rate to the auxiliary combustion chamber 12 is controlled by the ECU 16 to be relatively great such that the combustion components in the auxiliary combustion chamber 12 burn stably and a relatively strong torch flame is directed through at least one communication passage 12a. In response to the engine load or the number of engine revolutions increasing, the ECU 16 decreases the fuel supply rate to the auxiliary combustion chamber 12.

Under engine operating conditions that include high numbers of revolutions and high engine load (even when the combustion components in the main combustion chamber 4 are burned by torch flame), the ECU 16 may decrease to zero the fuel supply rate to the auxiliary combustion chamber 12. This is because, when the number of revolutions and the load are relatively high, the combustion components in the main combustion chamber 4 are close to the stoichiometric ratio such that the combustion components can stably be burned even if fuel is not supplied by the auxiliary combustion chamber fuel injection valve 15 to the auxiliary combustion chamber 12.

The operating conditions in which the ECU 16 sets to zero the fuel supply rate to the auxiliary combustion chamber 12 are not limited to when the air/fuel ratio in the main combustion chamber 4 is close to the stoichiometric ratio. For example, relatively rich air/fuel ratios that are introduced into the auxiliary combustion chamber 12 can stably be burned. More specifically, in a region A shown in FIG. 5, the fuel supply rate to the auxiliary combustion chamber 12 may also be set to zero by the ECU 16.

FIG. 8 shows a relationship between engine load (T; shown along the horizontal axis) and fuel supply rate (F; shown along the left vertical axis) to the auxiliary combustion chamber 12 and the phase difference (ΔT; shown along the right vertical axis). As explained above, ECU 16 reduces the fuel supply rate to the auxiliary combustion chamber 12 in response to the engine load increasing, and reduces to zero the fuel supply rate to the auxiliary combustion chamber 12 when the engine load becomes greater than a predetermined level (TF). On the other hand, under a relatively low engine load operating condition, only the combustion components in the auxiliary combustion chamber 12 are ignited by an igniter such that there is no phase difference. Ignition in the main combustion chamber 4 by the main combustion chamber spark plug 14 is started when the engine load is at least the predetermined value (TP), and thereafter the ECU 16 increases the phase difference as the engine load increases.

Under a cold start condition of the engine 1, it is desirable to suppress the discharge of unburned fuel and to increase the temperature of exhaust gas catalyst (not shown) by increasing the exhaust gas temperature. As it is used herein, the term "cold start condition" of an internal combustion engine refers to initiating engine operation after a sufficient period of time has passed for the temperatures of the engine and its auxiliary systems (e.g., pollution abatement systems) to equalize with the ambient temperature.

According to the first embodiment, combustion components in the main and auxiliary combustion chambers 4, 12 are simultaneously ignited (i.e., phase difference is zero) at the time of a cold start condition. Preferably, ECU 16 also retards the ignition timing. When ignition timing is retarded at the time of a cold start condition, there is an adverse possibility that the torch flame alone may not sufficiently burn the combustion components in the main combustion chamber 4. However, if the combustion components in the main combustion chamber 4 are simultaneously ignited by the main combustion chamber spark plug 14, the combustion components in the main combustion chamber 4 may burn more reliably without weakening the torch flame.

Advantages According to the First Embodiment

According to the first embodiment, ignition is carried out by the main combustion chamber spark plug 14 before the auxiliary combustion chamber spark plug 13 in response to at least one operating condition. Thus, the pressure difference between the main combustion chamber 4 and the auxiliary combustion chamber 12, which determines the intensity of the torch flame, can be reduced, and thereby the intensity of the torch flame may be optimized for the operating conditions(s).

When the pressure in the main combustion chamber 4 increases due to ignition by the main combustion chamber spark plug 14 of the combustion components in the main combustion chamber 4, the density of the combustion components in the auxiliary combustion chamber 12 also increases and thereby the heat value of the combustion in the auxiliary combustion chamber 12 also increases. However, the combustion period in the auxiliary combustion chamber 12 is limited such that an increase in the pressure in the auxiliary combustion chamber 12 due to the increased heat value becomes smaller than the pressure increase in the main combustion chamber 4. Thus, there is an improved net heat efficiency of an auxiliary combustion chamber type internal combustion engine according to the first embodiment.

Also, the intensity of torch flame directed through the at least one communication passage 12a depends on the phase difference. According to the first embodiment, since the phase difference is controlled in response to at least one engine operating condition, a torch flame of appropriate intensity can be provided for a given engine operating condition.

Under a low engine load operating condition, it is desirable to provide a strong torch flame, while under a high engine load operating condition, it is desirable to suppress the intensity of the torch flame. Hence, as shown in FIG. 5 or 8, the ECU 16 reduces the phase difference as the engine load decreases. Accordingly, it is possible to provide a torch flame of optimal intensity that is suitable for a given engine load condition.

When the engine load is equal to or lower than a predetermined low load level, the ECU 16 discontinues the ignition in the main combustion chamber 4 and only the combustion components in the auxiliary combustion chamber are ignited by an igniter. When a lean air/fuel ratio is used under a low engine load operating condition, combustion by a strong torch flame in the main combustion chamber 4 is especially effective. Thus, according to the first embodiment, it is possible to maximize the intensity of the torch flame to carry out stable lean combustion.

Similarly, the ECU 16 reduces the phase difference in response to a decreasing engine rotation speed operating condition, i.e., when the number of engine revolutions becomes smaller. When there is a low engine rotation speed operating condition, knocking may result so the torch flame intensity is made strong in order to stabilize combustion. On the other hand, when there is a high engine rotation speed operating condition, cooling losses due to the torch flame colliding against the piston crown may become a problem. By controlling the phase displacement according to the first embodiment, it is possible to provide a torch flame of optimal intensity that is suitable for a given engine rotation speed operating condition.

When the operating conditions include high engine load and high engine rotation speed, stable combustion in the main combustion chamber 4 may be achieved without depending upon the torch flame, but collisions between the torch flame and either the piston crown or the wall surface of the cylinder may increase cooling losses. On the other hand, if ignition in the auxiliary combustion chamber 12 is discontinued, there is an adverse possibility that incomplete combustion may occur in the auxiliary combustion chamber 12. Hence, according to the first embodiment, the ECU 16 maximizes the phase difference under these operating conditions so that it is possible to minimize the intensity of the torch flame, and to also sufficiently burn the combustion components in the auxiliary combustion chamber 12. As a result, the amount of unburned hydrocarbons that are discharged may be reduced. Preferably, the maximum value of the phase difference may be determined based on the shape of the combustion chamber, for example.

At the time of a cold start engine operating condition, it is desirable to suppress the discharge of unburned hydrocarbons and to increase the temperature of the exhaust gas in order to increase the temperature of the catalyst of exhaust gas. Hence, combustion components in the main and auxiliary combustion chambers 4, 12 may be simultaneously ignited (i.e., the ECU 16 reduces the phase difference to zero) during a cold start engine operating condition, and the ECU 16 may retard the ignition timing. This makes it possible to maintain the intensity of torch flame and at the same time burn the combustion components more reliably due to the ignition in the main combustion chamber 4. As a result, the amount of unburned hydrocarbons can be reduced, and the temperature of the exhaust gas can be quickly increased to thereby increase the temperature of the exhaust gas catalyst.

According to the first embodiment, the auxiliary combustion chamber 12 is disposed at a substantially central portion of the main combustion chamber 4 and on the underside of the cylinder head 1a, and the main combustion chamber spark plug 14 is disposed at a substantially outer peripheral portion of the main combustion chamber 4. Therefore, the torch flame that is directed through the at least one communication passage 12a evenly spreads into the main combustion chamber 4, and combustion components in the main combustion chamber 4 can be stably burned. Since the main combustion chamber spark plug 14 is disposed at a location sufficiently separated away from the auxiliary combustion chamber 12, there is relatively long distance through which a flame front that is generated by the ignition in the main combustion chamber travels before reaching the at least one communication passage 12a. Thus, it is possible to maximize the phase difference between the ignition in the main combustion chamber and the ignition in the auxiliary combustion chamber, and to thereby increase the ability to vary the intensity of the torch flame so as to achieve a torch flame of intensity suitable for a given engine operating condition(s).

As shown in FIG. 6, opening areas of first communication passage(s) 12a', which are oriented toward the main combustion chamber spark plug 14, may be smaller than those of second communication passage(s) 12a that are not oriented toward the main combustion chamber spark plug 14. Accordingly, a torch flame directed through the second communication passage(s) 12a may be stronger than a torch flame directed through the first communication passage(s) 12a'. The amount of unburned combustion components in the main combustion chamber 4 that are distal from the main combustion chamber spark plug 14, i.e., at a location where the flame front in the main combustion chamber 4 has not yet reached, is greater than the amount that is proximal to the main combustion chamber spark plug 14, i.e., closer to the beginning of the flame front propagation in the main combustion chamber 4. Therefore, the first and second communication passages 12a, 12a' according to the first embodiment may provide more effective burning of the combustion components in the main combustion chamber 4.

As illustrated in FIG. 1, the auxiliary combustion chamber fuel injection valve 15 may be provided in the auxiliary combustion chamber 12. Usually, the air/fuel ratio of combustion components to be supplied to the auxiliary combustion chamber 12 is substantially the same as the air/fuel ratio of combustion components in the main combustion chamber 4. However, the intensity of torch flame is determined by the pressure difference between the main combustion chamber 4 and the auxiliary combustion chamber 12, and the pressure increase in the auxiliary combustion chamber 12 is influenced by the air/fuel ratio of combustion components in the auxiliary combustion chamber 12. Thus, by controlling the supply of the fuel to the auxiliary combustion chamber 12 via the auxiliary combustion chamber fuel injection valve 15, it is possible according to the first embodiment to control the pressure difference between the main combustion chamber 4 and the auxiliary combustion chamber 12, and thereby to more precisely control the intensity of the torch flame.

If the fuel that is supplied to the auxiliary combustion chamber 12 has a combustion speed faster than that of fuel supplied to the main combustion chamber 4, it is possible according to the first embodiment to increase the pressure difference between the main combustion chamber 4 and the auxiliary combustion chamber 12, and to thereby increase the ability to vary the intensity of the torch flame so as to achieve a torch flame of intensity suitable for a given engine operating condition(s).

Preferably, the air/fuel ratio in the main combustion chamber 4 is diluted as the engine load is reduced. For this reason, when the engine operating condition includes relatively low engine load, the combustion components in the auxiliary combustion chamber 12 are also diluted, and an insufficient torch flame may result. Hence, according to the first embodiment, the ECU 16 increases the fuel supply amount to the auxiliary combustion chamber 12 in response to the engine load decreasing. Such control makes it possible provide a sufficient torch flame when there is a relatively low engine load operating condition, and also to prevent an excessively high torch flame intensity when there is a relatively high engine load operating condition.

As when the engine load varies, the air/fuel ratio in the main combustion chamber 4 is preferably diluted as when the engine rotation speed decreases, and an insufficient torch flame may result. According to the first embodiment, the ECU 16 increases the amount of the fuel supplied to the auxiliary combustion chamber 12 in response to the engine rotation speed decreasing. Therefore, under a relatively low engine rotation speed operating condition, a sufficient torch flame may be provided, and under a relatively high engine rotation speed operating condition, it is possible to prevent an excessively high torch flame intensity.

Next, a second embodiment will be explained with reference to FIG. 9. Since the basic configuration of the internal combustion engine 1 is generally the same as that of the first embodiment, only differences will be explained in detail.

The second embodiment differs from the first embodiment in that the main combustion chamber spark plug 14 is located at a substantially central portion of the main combustion chamber 4 and on the underside of the cylinder head 1a, and in that the auxiliary combustion chamber 12 is disposed at a substantially outer peripheral portion of the main combustion chamber 4 and near the intake port 5. As in the first embodiment, the auxiliary combustion chamber spark plug 13 and the auxiliary combustion chamber fuel injection valve 15 are preferably disposed in the auxiliary combustion chamber 12.

By controlling the phase difference between the timing of ignition in the main combustion chamber by the main combustion chamber spark plug 14 and ignition in the auxiliary combustion chamber by the auxiliary combustion chamber spark plug 13, the intensity of torch flame is controlled as in the first embodiment.

Advantages of the Second Embodiment

In the second embodiment, since the main combustion chamber spark plug 14 is disposed at substantially the central portion of the main combustion chamber 4, propagation of the flame front in the main combustion chamber 4 is more uniform when combustion components in the main combustion chamber 4 are ignited by the main combustion chamber spark plug 14. That is to say, the combustion components in the main combustion chamber 4 can be effectively burned by the main combustion chamber spark plug 14. Then, assuming a relatively large phase difference between the ignition in the main combustion chamber 4 and ignition in the auxiliary combustion chamber 12 under engine operating conditions including relatively high engine load or relatively high engine rotation speed, combustion by ignition in the main combustion chamber 4 contributes most of the output, and thus improved combustion can be obtained according to the second embodiment.

The combustion components supplied via the intake port 5 are prone to stay near the intake port 5, and thus may not be sufficiently burned. Thus, there is a problem that unburned hydrocarbons could be discharged. According to the second embodiment, the auxiliary combustion chamber 12 is provided near the intake port 5, and since the torch flame provides strong turbulence near the intake port 5, the combustion components near the intake port 5 may be dispersed and burned.

Next, a third embodiment will be explained with reference to FIG. 10. Since the basic configuration of the internal combustion engine 1 is the same as that of the first embodiment, only differences will be explained in detail.

As in the second embodiment, the third embodiment includes disposing the auxiliary combustion chamber 12 at a substantially outer peripheral portion of the main combustion chamber 4 and near the intake port 5. The main combustion chamber spark plug 14 is disposed at a substantially outer peripheral portion of the main combustion chamber 4 and at a position substantially opposite to the auxiliary combustion chamber 12.

A second main combustion chamber spark plug 17 capable of igniting combustion components in the main combustion chamber 4 is disposed at a substantially central portion of the main combustion chamber 4 and on the underside of the cylinder head 1a.

Combustion components in the main combustion chamber 4 are ignited primarily by the main combustion chamber spark plug 14, while combustion components in the auxiliary combustion chamber 12 are ignited by the auxiliary combustion chamber spark plug 13. Then, assuming engine operating conditions that include relatively high engine load and relatively high engine rotation speed, the phase difference between the ignition in the main combustion chamber and the ignition in the auxiliary combustion chamber is substantially maximized. In this case, the ignition in the main combustion chamber may be switched from the main combustion chamber spark plug 14 to the second main combustion chamber spark plug 17. At that time, combustion components in the auxiliary combustion chamber 12 are ignited by the auxiliary combustion chamber spark plug 13 as with other operating conditions.

Advantages of the Third Embodiment

In the third embodiment, since the main combustion chamber spark plug 14 and the auxiliary combustion chamber spark plug 13 are relatively separated from each other, it takes relatively long time for the flame front generated due to ignition by the main combustion chamber spark plug 14 to reach the auxiliary combustion chamber 12. Therefore, it is possible to increase the phase difference between the ignition in the main combustion chamber 4 and the ignition in the auxiliary combustion chamber 12, and to thereby increase the ability to vary the intensity of the torch flame so as to achieve a torch flame of intensity suitable for a given engine operating condition(s).

When the engine operating conditions include a relatively high engine load or a relatively high engine rotation speed, the ECU 16 maximizes the phase difference between the ignition in the main combustion chamber and the ignition in the auxiliary combustion chamber, and combustion components in the main combustion chamber 4 are ignited by the second main combustion chamber spark plug 17. Since the second main combustion chamber spark plug 17 is disposed at substantially the central portion of the main combustion chamber 4, propagation of the flame front in the main combustion chamber 4 is more uniform when combustion components in the main combustion chamber 4 are ignited by the second main combustion chamber spark plug 17.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. An internal combustion engine comprising:
   a main combustion chamber;
   an auxiliary combustion chamber having a capacity smaller than that of the main combustion chamber and being fluidly communicated with the main combustion chamber through a torch flame passage formed therebetween;
   a first igniter disposed in the auxiliary combustion chamber;
   a second igniter disposed in the main combustion chamber; and
   a controller electrically coupled to the first and second igniters and configured to determine and control ignition timings of the first and second igniters respectively in response to at least one engine operating condition such that ignition in the auxiliary combustion chamber occurs after ignition in the main combustion chamber, wherein the controller varies a phase angle difference between the ignition in the main combustion chamber and the ignition in the auxiliary combustion chamber in response to an engine condition;

wherein the phase angle difference is controlled to be smaller as an engine load decreases.

2. The internal combustion engine according to claim 1, wherein the controller discontinues the ignition in the main combustion chamber and continues the ignition in the auxiliary combustion chamber when the engine is in a predetermined low engine load level condition.

3. The internal combustion engine according to claim 1, wherein the auxiliary combustion chamber is disposed at a substantially central upper portion of the main combustion chamber, and the second igniter is disposed at an outer peripheral portion of the main combustion chamber.

4. The internal combustion engine according to claim 1, wherein the auxiliary combustion chamber is disposed at an outer peripheral portion of the main combustion chamber, and the second igniter is disposed at a central upper portion of the main combustion chamber.

5. The internal combustion engine according to claim 1, wherein the auxiliary combustion chamber is disposed at a first outer peripheral portion of the main combustion chamber, and the second igniter is disposed at a second outer peripheral portion of the main combustion chamber, and the second outer peripheral portion is disposed substantially opposite to the first outer peripheral portion.

6. The internal combustion engine according to claim 5, wherein the first outer peripheral portion is proximate to an intake port of the engine.

7. The internal combustion engine according to claim 6, further comprising:
a third igniter being disposed at a substantially central upper portion of the main combustion chamber and being electrically coupled to the controller;
wherein ignition in the main combustion chamber is performed by the third igniter when the engine is in a high engine load and high engine rotation speed condition above predetermined levels.

8. The internal combustion engine according to claim 1, wherein the torch flame passage includes first and second torch flame passages, the first torch flame passage being oriented toward the second igniter and having a smaller opening area than that of the second torch flame passage.

9. The internal combustion engine according to claim 1, further comprising:
an injector to inject fuel in the auxiliary combustion chamber.

10. The internal combustion engine according to claim 9, wherein the fuel supplied to the injector has a property of a higher combustion speed than fuel supplied to the main combustion chamber.

11. The internal combustion engine according to claim 9, wherein a fuel supply rate to the auxiliary combustion chamber is increased as an engine load decreases.

12. The internal combustion engine according to claim 9, wherein a fuel supply rate to the auxiliary combustion chamber is increased as an engine rotation speed decreases.

13. An internal combustion engine comprising:
a main combustion chamber;
an auxiliary combustion chamber having a capacity smaller than that of the main combustion chamber and being fluidly communicated with the main combustion chamber through a torch flame passage formed therebetween;
a first igniter disposed in the auxiliary combustion chamber;
a second igniter disposed in the main combustion chamber; and
a controller electrically coupled to the first and second igniters and configured to determine and control ignition timings of the first and second igniters respectively in response to at least one engine operating condition such that ignition in the auxiliary combustion chamber occurs after ignition in the main combustion chamber, wherein the controller varies a phase angle difference between the ignition in the main combustion chamber and the ignition in the auxiliary combustion chamber in response to an engine condition;
wherein the phase angle difference is controlled to be smaller as an engine rotation speed decreases.

14. An internal combustion engine comprising:
a main combustion chamber;
an auxiliary combustion chamber having a capacity smaller than that of the main combustion chamber and being fluidly communicated with the main combustion chamber through a torch flame passage formed therebetween;
a first igniter disposed in the auxiliary combustion chamber;
a second igniter disposed in the main combustion chamber; and
a controller electrically coupled to the first and second igniters and configured to determine and control ignition timings of the first and second igniters respectively in response to at least one engine operating condition such that ignition in the auxiliary combustion chamber occurs after ignition in the main combustion chamber, wherein the controller varies a phase angle difference between the ignition in the main combustion chamber and the ignition in the auxiliary combustion chamber in response to an engine condition;
wherein the phase angle difference is controlled to be maximized when the engine is in a high engine load and a high engine rotation speed condition and the phase angle difference is controlled to be smaller as an engine load decreases.

15. An internal combustion engine comprising:
a main combustion chamber;
an auxiliary combustion chamber having a capacity smaller than that of the main combustion chamber and being fluidly communicated with the main combustion chamber through a torch flame passage formed therebetween;
a first igniter disposed in the auxiliary combustion chamber;
a second igniter disposed in the main combustion chamber; and
a controller electrically coupled to the first and second igniters and configured to determine and control ignition timings of the first and second igniters respectively in response to at least one engine operating condition such that ignition in the auxiliary combustion chamber occurs after ignition in the main combustion chamber, wherein the controller varies a phase angle difference between the ignition in the main combustion chamber and the ignition in the auxiliary combustion chamber in response to an engine condition;
wherein the phase angle difference is controlled to substantially zero and the ignition timings of the main and auxiliary combustion chambers are retarded when the engine is in a cold start condition.

* * * * *